(12) United States Patent
Osuki

(10) Patent No.: US 9,906,681 B2
(45) Date of Patent: Feb. 27, 2018

(54) IMAGE PROCESSING APPARATUS, TRANSMISSION METHOD, AND STORAGE MEDIUM STORING PROGRAM

(71) Applicant: CANON KABUSHIKI KAISHA, Tokyo (JP)

(72) Inventor: Takashi Osuki, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/378,893

(22) Filed: Dec. 14, 2016

(65) Prior Publication Data

US 2017/0180601 A1 Jun. 22, 2017

(30) Foreign Application Priority Data

Dec. 22, 2015 (JP) ................. 2015-250497

(51) Int. Cl.
| | |
|---|---|
| G06K 15/02 | (2006.01) |
| H04N 1/333 | (2006.01) |
| H04N 1/00 | (2006.01) |
| H04N 1/32 | (2006.01) |

(52) U.S. Cl.
CPC ....... *H04N 1/33315* (2013.01); *H04N 1/0044* (2013.01); *H04N 1/32539* (2013.01); *H04N 2201/0093* (2013.01); *H04N 2201/0094* (2013.01); *H04N 2201/325* (2013.01); *H04N 2201/33328* (2013.01); *H04N 2201/33378* (2013.01)

(58) Field of Classification Search
USPC ...... 358/1.1–3.29, 1.11–1.18, 501, 528, 532, 358/405
See application file for complete search history.

(56) References Cited

U.S. PATENT DOCUMENTS

| | | | | |
|---|---|---|---|---|
| 5,239,389 | A | 8/1993 | Kochis et al. | 358/451 |
| 7,420,699 | B2 * | 9/2008 | Farrell | G06F 3/1214 358/1.13 |
| 7,990,569 | B2 * | 8/2011 | Hino | H04N 1/00347 358/1.15 |
| 2006/0028663 | A1 * | 2/2006 | Maeda | H04N 1/3875 358/1.9 |
| 2008/0019593 | A1 * | 1/2008 | Kashiwagi | H04N 1/00225 382/190 |

FOREIGN PATENT DOCUMENTS

JP    H05-199350    8/1993

* cited by examiner

*Primary Examiner* — Marcellus Augustin
(74) *Attorney, Agent, or Firm* — Fitzpatrick, Cella, Harper & Scinto

(57) ABSTRACT

An original is read, image data is generated, image data of a set transmission resolution is generated based on the generated image data, printing is performed based on the generated image data, a transmission instruction is accepted, and image data of a set transmission resolution is transmitted in accordance with the accepted transmission instruction.

17 Claims, 4 Drawing Sheets

IMAGE PROCESSING APPARATUS, TRANSMISSION METHOD, AND STORAGE MEDIUM STORING PROGRAM

BACKGROUND OF THE INVENTION

Field of the Invention

The present invention relates to an image processing apparatus that can execute a fax transmission function, a transmission method, and a storage medium storing a program.

Description of the Related Art

In a case of using a fax transmission function to transmit data, image data is transmitted by a bit image. In an apparatus having a fax transmission function, one resolution is selected from a plurality of resolutions at a time of transmission of data, and the data is transmitted in the selected resolution. At that time, the higher the resolution that transmission is performed at, the greater a transmission time becomes and the greater a telephone charge becomes. Meanwhile, the lower the resolution the transmission is performed at, the greater a probability that detailed characters or complicated image data will be unreadable when printed by a transmission destination fax reception device.

When executing a fax transmission function in an apparatus provided with a reading apparatus for reading an image of an original, a fax transmission image may be printed and checked. Typically, a resolution of an image differs in a copy function and a fax transmission function. Therefore, as a print function for a preview of a fax transmission, there is a need to print at the fax transmission resolution as recited in Japanese Patent Laid-Open No. H05-199350. In addition, in a case of desiring to change the resolution and perform a check or a transmission after preview printing, a reading operation must be performed again.

SUMMARY OF THE INVENTION

An aspect of the present invention is to eliminate the above-mentioned problems with the conventional technology. The present invention provides an image processing apparatus, a transmission method, and a storage medium storing a program, for improving convenience for a user when executing a fax transmission function.

The present invention in one aspect provides an image processing apparatus, comprising: a reading unit configured to read an original and generate image data; a setting unit configured to set a transmission resolution; a generation unit configured to generate image data of the transmission resolution set by the setting unit, based on the image data generated by the reading unit; a printing unit configured to perform printing based on the image data generated by the generation unit; a receiving unit configured to receive a transmission instruction; and a transmission unit configured to transmit the image data of the transmission resolution set by the setting unit, in accordance with the transmission instruction received by the receiving unit.

According to the present invention, it is possible to improve convenience for a user when executing a fax transmission function.

Further features of the present invention will become apparent from the following description of exemplary embodiments with reference to the attached drawings.

DESCRIPTION OF THE EMBODIMENTS

Figure 1:
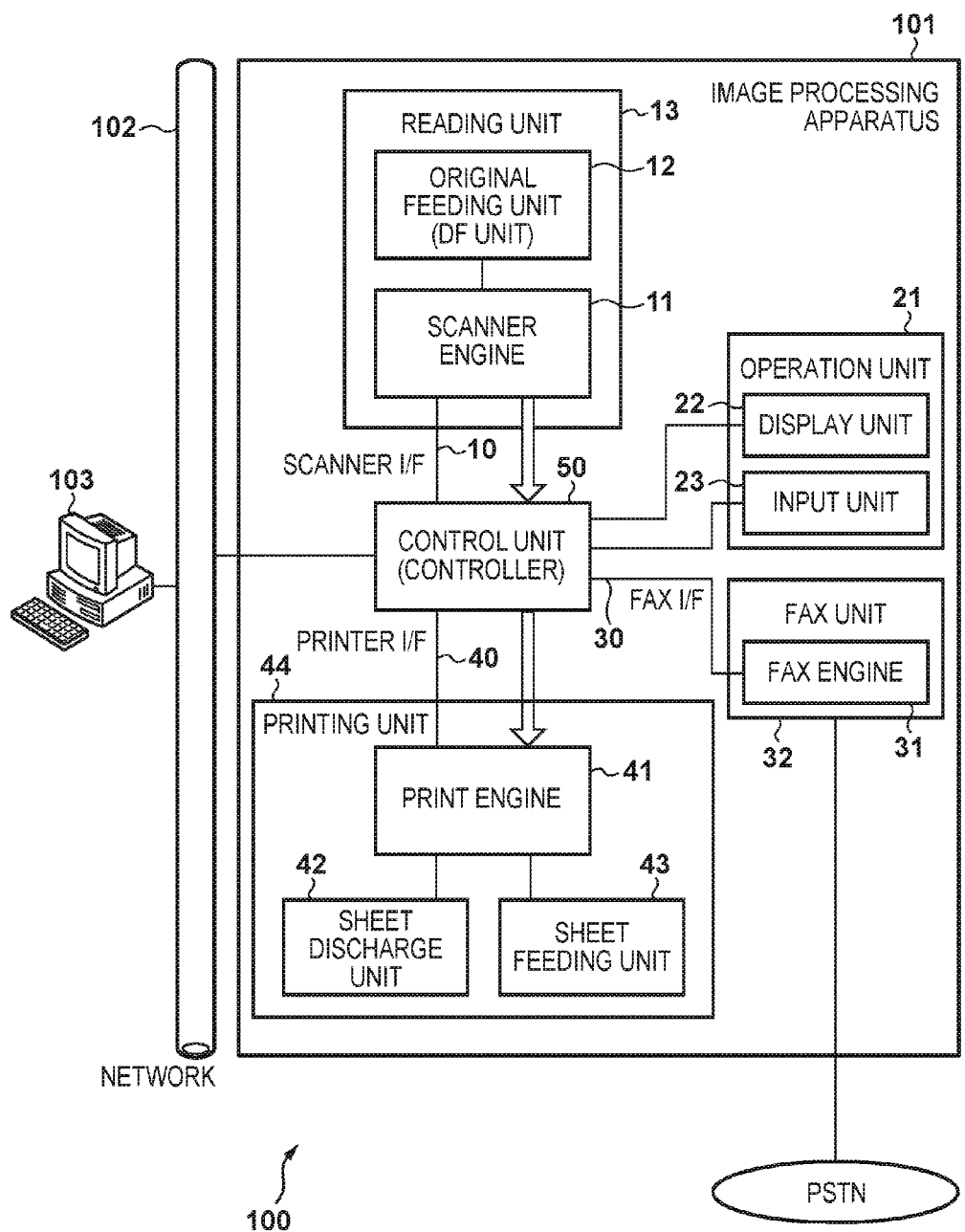
FIG. 1 is a view for illustrating a configuration of a job processing system.

Embodiments of the present invention will be described hereinafter in detail, with reference to the accompanying drawings. Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals have been added to the same configuration elements, and explanation thereof is omitted.

FIG. 1 is a view for illustrating a configuration of a job processing system 100 in the present embodiment. The job processing system 100 includes an image processing apparatus 101 and an information processing apparatus 103 such as a PC or a mobile terminal. The image processing apparatus 101 and the information processing apparatus 103 are connected to enable mutual communication via a network 102 such as a wired or wireless LAN. The image processing apparatus 101 includes an image reading apparatus for optically reading an image on an original, a FAX apparatus for executing a facsimile transmission function, and a print apparatus for printing an image on a printing medium. In the present embodiment, a color MFP (Multi Functional Peripheral), for example, is used as the image processing apparatus 101. The image processing apparatus 101 includes a control unit (controller) 50, a reading unit 13, a printing unit 44, a FAX unit 32, and an operation unit 21. The image processing apparatus 101 executes a job received from the information processing apparatus 103, or a job input on the image processing apparatus 101. A job corresponds to each function that can be executed by the image processing apparatus 101, and for example there is a print job or a scan job.

The reading unit 13 corresponds to the above-described image reading apparatus, and includes a scanner engine 11 and an original feeding unit (document feeder (DF) unit) 12. The scanner engine 11 is a unit that includes a light source that irradiates light onto an original and an image sensor for receiving reflected light from the original, and, based on a scan job, optically reads an image on the original and generates read data. The original feeding unit 12 is a unit for feeding an original positioned on an original platen tray (not shown) until a reading position that the scanner engine 11 can read. The scanner engine 11 reads an image on the original fed by the original feeding unit 12 and generates read data. In addition, there are cases in which the scanner engine 11 is placed on the original platen, and generates the read data by reading the original which is restrained by a pressing plate.

The printing unit 44 corresponds to the above-described print apparatus, and includes a sheet feeding unit 43, a print engine 41, and a sheet discharge unit 42. The sheet feeding unit 43 holds a printing medium for printing, and is a unit that includes a mechanism for conveying the printing medium to the print engine 41. Below it is assumed that a sheet is used as an example of a printing medium. The print engine 41 is a unit for performing printing based on image data and a print job. For example, the print engine 41 performs printing by transferring toner to a sheet for printing, and then fixing the sheet to which transferring was performed. Note that a method of printing may be performed by another printing method, and, for example, may be performed by an ink-jet printing method that prints by discharging ink droplets from a printing head onto a sheet. The sheet discharge unit 42 is a unit for discharging a printed sheet, that executes post-processing such as sorting or stapling as needed.

The FAX unit 32 corresponds to the above-described FAX apparatus, and includes a FAX engine 31. The FAX engine 31 performs fax transmission or fax reception of data with an external FAX apparatus via a PSTN (public exchange telephone network), based on a FAX job. The operation unit 21 includes an input unit 23 configured by, for example, a touch sensor and a display unit 22 that is configured by an LCD (Liquid Crystal Display) or the like. The operation unit 21 displays on the display unit 22 apparatus information such as a job processing state of the image processing apparatus 101, or a setting screen of each function. In addition, the operation unit 21 receives (accepts) various instruction operations from a user via the input unit 23, and transmits details of received instruction operations to the control unit 50.

The control unit 50 is connected to the reading unit 13, the printing unit 44, the FAX unit 32, and the operation unit 21, and comprehensively controls each of these based on a job input to the image processing apparatus 101 for example. In addition, the control unit 50 is connected to the information processing apparatus 103 via the LAN 102 to enable mutual communication therebetween, and performs transmission and reception of data with the information processing apparatus 103. The control unit 50 comprehensively controls the image processing apparatus 101 so as to execute various jobs in accordance with an instruction from a user received via the information processing apparatus 103 or the operation unit 21.

For example, in a case where the control unit 50 executes a copy job, the control unit 50 receives a copy setting and a copy execution initiation instruction from a user via the operation unit 21, and causes the reading unit 13 to execute reading of an original. The control unit 50 then executes predetermined image processing in accordance with the copy setting after receiving and storing in a memory unit 208 of FIG. 2 read data of the original that is read by the reading unit 13. The control unit 50 transfers to the printing unit 44 image data for which predetermined image processing such as correction processing or color space conversion has been executed, and causes the printing unit 44 to execute printing. If a setting for executing post-processing such as stapling is made in the copy setting, the control unit 50 causes the printing unit 44 to execute post-processing.

In addition, for example, in a case of the control unit 50 executing a print job, the control unit 50 receives image data and a print setting from the information processing apparatus 103, and causes the printing unit 44 to print the received image data in accordance with the received print setting. In addition, for example, in a case of the control unit 50 executing a FAX job, the control unit 50 stores in the memory unit 208 the read data that is read by the reading unit 13 and image data for a fax transmission that is generated from the read data. The control unit 50 then transmits, by the FAX unit 32, the image data for fax transmission to a FAX apparatus that is a fax transmission destination.

Figure 2:
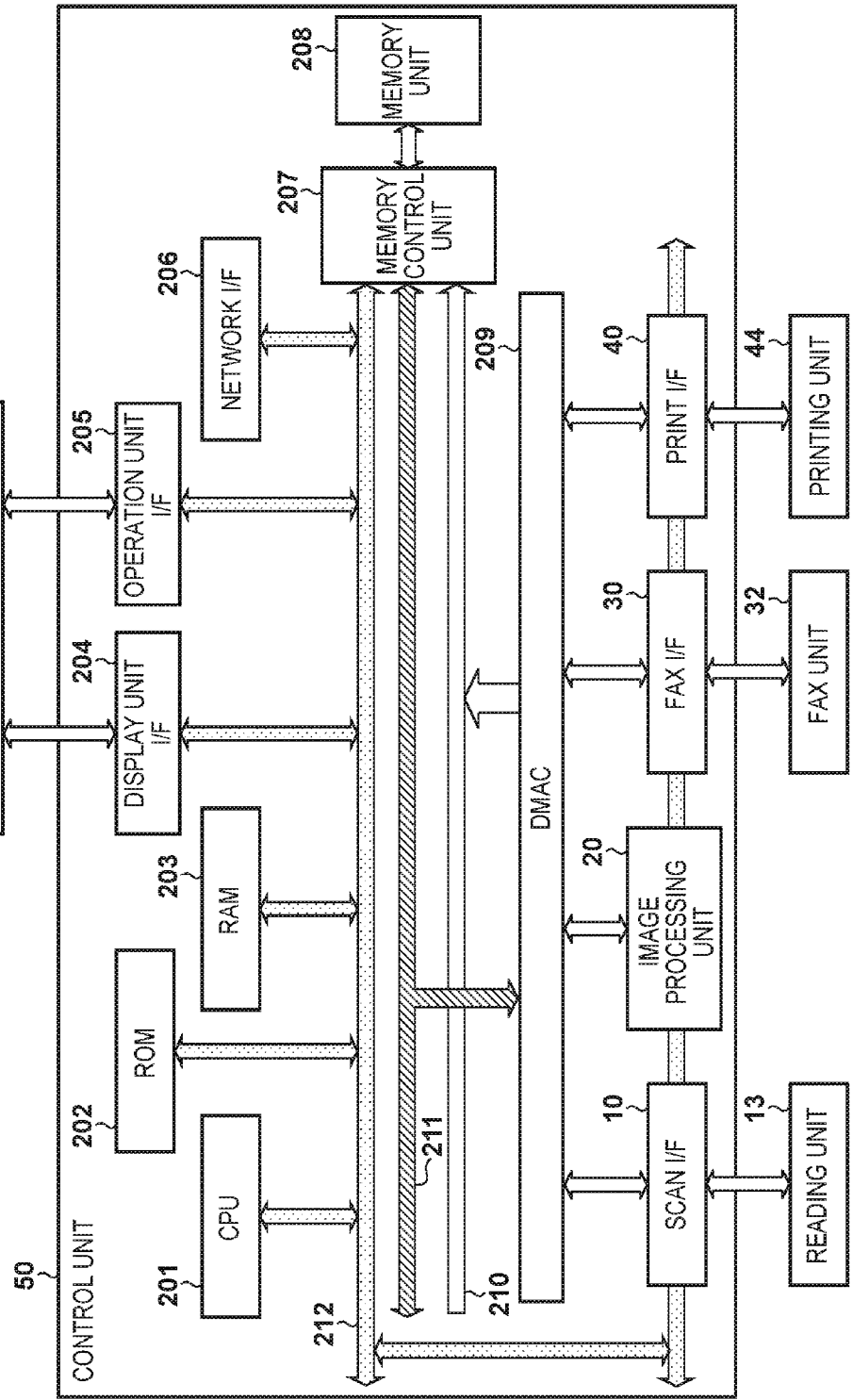
FIG. 2 is a view for illustrating a configuration of a control unit.

FIG. 2 is a view for illustrating a configuration of the control unit 50. A CPU 201 executes each function of the image processing apparatus 101 by reading a program stored in a ROM 202 into a RAM 203 and executing it. The ROM 202 is a general-purpose ROM, and stores, for example, data or a program necessary for operation of the image processing apparatus 101. The RAM 203 is a general-purpose RAM, and functions as a work area of the CPU 201.

A display unit interface (I/F) 204 controls transmission and reception of data with the operation unit 21. For example, data for display transmitted from the CPU 201 is transferred to the operation unit 21. In addition, an operation unit I/F 205 transmits to the CPU 201 details of an instruction operation received from a user via the operation unit 21. A network I/F 206 has a configuration that supports a medium of the LAN 102, and, when the CPU 201 communicates with an external apparatus such as the information processing apparatus 103 via the LAN 102, the network I/F 206 controls transmission and reception of data with the external apparatus.

A memory control unit 207 is connected to a first bus 210, a second bus 211, and a third bus 212, and controls data transfer for writing/reading data with respect to the memory unit 208. The memory unit 208 stores various data, and for example stores image data that is a printing target, or read data that is read by the reading unit 13. In addition, the memory unit 208 stores setting values for when image processing image data or read data as a job. Note that the memory unit 208 can store a plurality of these jobs, and the plurality of jobs stored in the memory unit 208 are executed by the CPU 201 in an order in accordance with a time for which they were stored or the like. In this way, the memory unit 208 also functions as a holding unit (queue) for holding a plurality of jobs until a job that is an execution target is executed.

A scan I/F 10 is connected to the reading unit 13, and controls transmission and reception of data between the control unit 50 and the reading unit 13. For example, the scan I/F 10 transfers a command from the CPU 201 to the reading unit 13, and transfers read data that is read by the reading unit 13 to the memory control unit 207.

An image processing unit 20 executes image processing in accordance with a user setting on the read data written to the memory unit 208 via the scan I/F 10. For example, in a case where a setting to perform a monochrome copy has been made by a user, the image processing unit 20 performs processing to convert color image data read by the reading unit 13 into monochrome image data. Furthermore, the image processing unit 20 performs image processing for turning read data or image data into data that can be printed by the printing unit 44. For example, by a resolution conversion or the like, the image processing unit 20 performs processing to generate image data that supports a print resolution for the printing unit 44. In addition, by a resolution conversion or the like, the image processing unit 20 performs image processing for generating data that can be transmitted by the FAX unit 32. For example, the image processing unit 20 performs processing to generate image data that supports a fax transmission resolution in accordance with the FAX unit 32.

A print I/F 40 is connected to the printing unit 44, and controls transmission and reception of data between the control unit 50 and the printing unit 44. For example, the print I/F 40 outputs to the printing unit 44 image data that is a printing target. A FAX I/F 30 is connected to the FAX unit 32 and outputs to the FAX unit 32 image data that is a fax transmission target. A DMA controller (DMAC) 209 controls data transfer among the scan I/F 10, the image processing unit 20, the FAX I/F 30, the print I/F 40, and the memory control unit 207.

Figure 3:
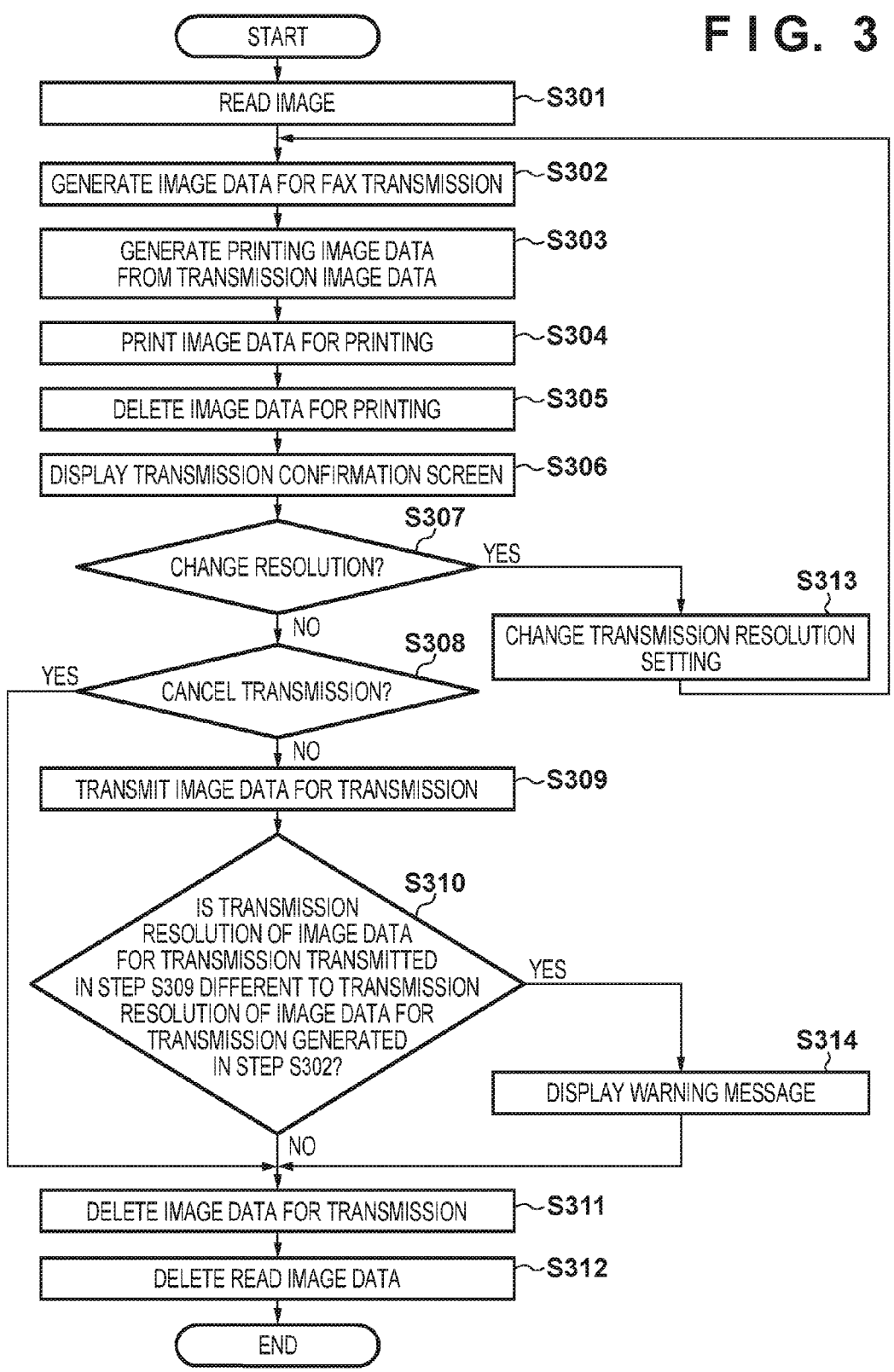
FIG. 3 is a flowchart illustrating control processing for when a facsimile transmission function is executed.

FIG. 3 is a flowchart illustrating transmission control processing for when executing a facsimile transmission function in the present embodiment. When an original is read by the scan function and an image that is scheduled for a fax transmission is test printed on a sheet, the processing of FIG. 3 is executed. The processing of FIG. 3 is realized by, for example, the CPU 201 of the control unit 50 reading the program stored in the ROM 202 into the RAM 203 and executing it.

In step S301, the CPU 201 instructs the reading unit 13 for reading of an original, via the scan I/F 10. Here, reading of an original is performed at a resolution greater than or equal to a maximum transmission resolution at which a fax transmission is possible, and image data of a read multi-value image is stored in the memory unit 208. For example, the reading is performed at a resolution of 600 dpi×600 dpi which is greater than a maximum transmission resolution of 400 dpi×400 dpi at which a fax transmission is possible. As a result of the reading, multi-value image data of 600 dpi×600 dpi (corresponds to the read data) is generated and stored in the memory unit 208. In the explanation below, generated image data is assumed to be all stored in the memory unit 208, and "deleting data" refers to deleting data stored in the memory unit 208.

In step S302, the CPU 201 generates image data for fax transmission from the multi-value image data generated in step S301. For example, a resolution conversion from the 600 dpi×600 dpi multi-value image data generated in step S301 to 200 dpi×200 dpi binary image data as the image data for fax transmission is performed. At that time, the 600 dpi×600 dpi multi-value image data before the conversion is not deleted and is held in the memory unit 208. In addition, the image data for the fax transmission is also held in the memory unit 208. Description is given later, but if a transmission resolution for a fax transmission is changed, image data for fax transmission that corresponds to the transmission resolution after the change is generated from the read data held in the memory unit 208. In addition, if a fax transmission is instructed without a transmission resolution change being performed, the image data for fax transmission held in the memory unit 208 is transmitted. By such a configuration, from a preview print of an image that is a target of a fax transmission until the fax transmission, one scan operation that a user performs becomes sufficient, and it is possible to cause convenience for a user to improve.

In step S303, the CPU 201 generates image data for printing from the generated image data for fax transmission, and holds it in the memory unit 208. For example, if the print resolution of the printing unit 44 is 600 dpi×600 dpi, an enlargement process is executed with respect to the image data for fax transmission that is 200 dpi×200 dpi binary image data. By the enlargement process, 600 dpi×600 dpi binary image data for printing is generated and held in the memory unit 208.

In the present embodiment, configured in the memory unit 208 are a region for holding read data, a region for holding image data that is a target for fax transmission and is generated from the read data, and a region for holding image data for printing. However, instead of configuring a plurality of holding regions in one memory interior, configuration may also be taken to configure them as separate storage units.

In step S304, the CPU 201 transmits, via the print I/F 40, the image data for printing generated in step S303 to the printing unit 44 to perform printing. In step S305, the CPU 201 deletes the image data for printing if the printing completed successfully. Although it is not shown in FIG. 3, configuration may be taken such that, if printing of the image data for printing fails due to a jam or the like in step S304, a message to that effect is displayed in the display unit 22, and execution of the printing of the image data for printing again is enabled.

Figure 4:
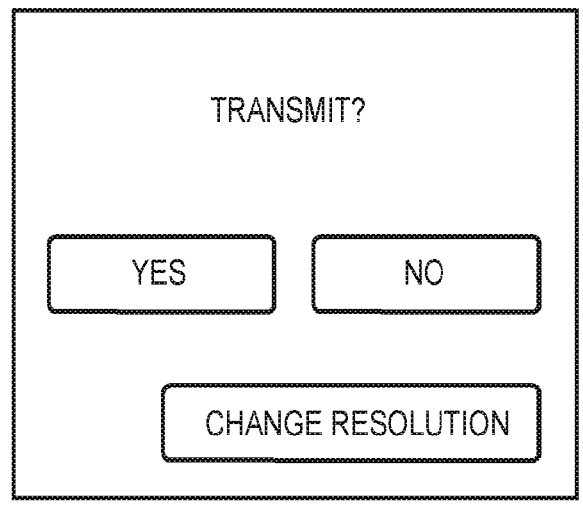
FIG. 4 is a view that illustrates a transmission confirmation screen.

In step S306, the control unit 50 displays on the display unit 22 a transmission confirmation screen as illustrated in FIG. 4. By such a configuration, a user can check an image that should be received by a fax transmission destination as printed matter before the fax transmission. A "YES" button of FIG. 4 corresponds to an instruction for fax transmission execution, and a "NO" button corresponds to an instruction for fax transmission cancellation. In addition, a "CHANGE RESOLUTION" button corresponds to an instruction for changing a transmission resolution in the fax transmission. In step S306, the CPU 201, in a case of determining that an instruction of any of a resolution change instruction, a transmission cancel instruction or a transmission execution instruction has been received, proceeds to the processing of step S307.

Figure 5:
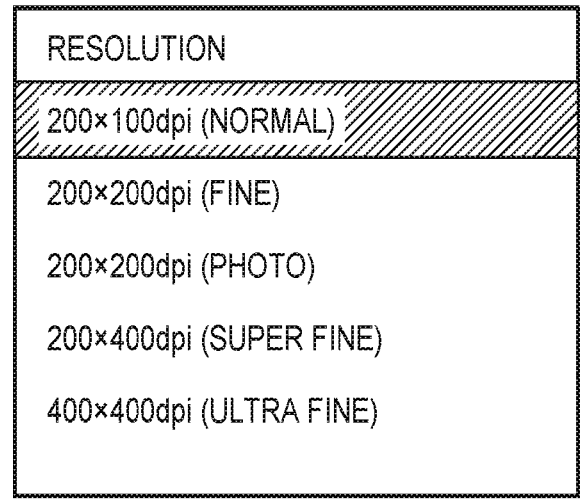
FIG. 5 is a view that illustrates a transmission resolution setting screen.

In step S307, the CPU 201 determines whether the received instruction is an instruction for changing the transmission resolution. Here, if it is determined to be an instruction for changing the transmission resolution, in step S313 the CPU 201 displays a transmission resolution modification screen illustrated in FIG. 5 on the display unit 22. As illustrated in FIG. 5, resolutions less than or equal to the read resolution for reading by the reading unit 13 are displayed in a list on the screen as candidates for a transmission resolution of a fax transmission, and it is possible to receive a selection from a user. Upon receiving the selection of any transmission resolution, the CPU 201 returns to step S302, and, from the multi-value image data stored in the memory unit 208 that was generated in step S301, generates image data for fax transmission by the transmission resolution changed in step S313, and successively executes the processing of step S303 and onward. Meanwhile, if it was determined in step S307 that the received instruction is not an instruction for changing the transmission resolution, the processing proceeds to step S308.

In step S308, the CPU 201 determines whether the received instruction is a fax transmission cancel instruction. Here, if it is determined to be a fax transmission cancel instruction, the processing proceeds to step S311. In step S311, the CPU 201 deletes the image data for fax transmission generated in step S302, in step S312 deletes multi-value image data generated in step S301, and thereafter terminates the processing of FIG. 3. Meanwhile, if it is determined not to be a fax transmission cancel instruction in step S308 (or to be a fax transmission execution instruction), the processing proceeds to step S309.

In step S309, the CPU 201 transmits the image data for fax transmission generated in step S302 to the FAX unit 32. The FAX unit 32 performs a FAX communication with an external FAX apparatus that is a transmission destination via a PSTN, and transmits the image data for fax transmission to the external FAX apparatus. At this time, the FAX unit 32 confirms a print capability of the transmission destination FAX apparatus by the FAX communication, and determines whether resolution data greater than or equal to the print capability of the transmission destination FAX apparatus is being obtained from the control unit 50. The print capability is a resolution for printing, for example. Here, if it is determined that image data of a resolution greater than or equal to the print capability of the transmission destination FAX apparatus is being obtained from the control unit 50, the image processing unit 20 further converts the image data to be a lower resolution until it enters an allowable range of the print capability of the transmission destination FAX apparatus. The FAX unit 32 then transmits the converted image data to the transmission destination FAX apparatus. In FAX communication, a communication method for confirming print capability information is not particularly limited if the capability information of a transmission partner apparatus can be obtained.

Figure 6:
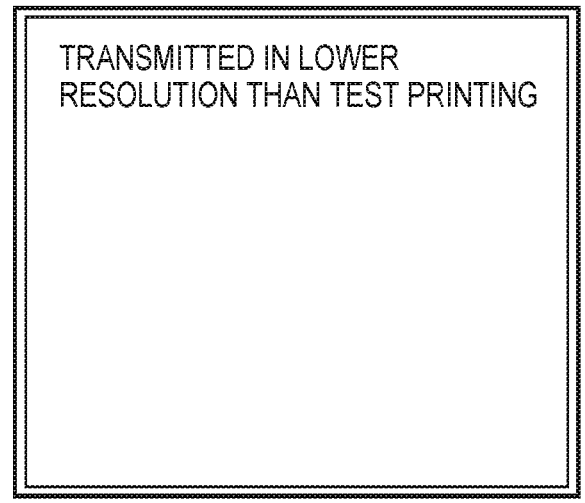
FIG. 6 is a view for illustrating a warning message screen.

In step S310, the CPU 201 determines a transmission resolution at which the FAX unit 32 actually performed the fax transmission in step S309 and the resolution of the image data for fax transmission generated in step S302—in other words whether it differs with or matches the transmission resolution for the fax transmission designated by a user. Here if it is determined that they differ, the processing proceeds to step S314. In step S314, the CPU 201 displays a message screen of FIG. 6 on the display unit 22. In this message screen, a message warning of the possibility of a difference occurring between a print result printed in step S304 and a print result output by the transmission destination is displayed. Meanwhile, if matching is determined in step S310, the processing proceeds to step S311. Regarding a difference that occurs between a print result that is printed and a print result output by the transmission destination, a user may be notified by a method other than a screen display, such as an LED display.

In step S311, the CPU 201 deletes the image data for fax transmission generated in step S302, in step S312 deletes multi-value image data generated in step S301, and thereafter terminates the processing of FIG. 3.

As described above, by virtue of the present embodiment, in an image processing apparatus (MFP) provided with a scanner and a printer, through preview printing before transmission of image data that is a target of a fax transmission, another preview print after converting a resolution, and the fax transmission, reading of the original image is only performed once. Furthermore if there is a possibility of a discrepancy occurring between an image for actually transmitting image data for a fax transmission and an image scheduled for a fax transmission that is printed by a preview print and checked, a warning message is displayed. As a result thereof, when performing a fax transmission, even if transmission is performed by lowering the resolution independent of a user instruction as a result of negotiation with the fax transmission destination, it is possible to cause the possibility for deterioration of fax reception image to be noticed by the sender side. As a result, it is possible to improve convenience for a user of the fax function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-250497, filed Dec. 22, 2015, which is hereby incorporated by reference herein in its entirety.

What is claimed is:
1. An image processing apparatus, comprising:
a scanner configured to read an original and generate image data;
a memory configured to store the generated image data;
a printer configured to execute printing based on image data;
a communication interface for communicating with an outside;
a display; and
one or more processors that execute a set of instructions so as to:
set a transmission resolution;
cause the scanner to read the original and generate image data;
store the generated image data in the memory;
generate image data for transmission corresponding to the set transmission resolution based on the image data stored in the memory;
cause the printer to execute printing based on the generated image data for transmission;
cause the display to display a confirmation screen for allowing a user to confirm whether to execute transmission, in accordance with a completion of the printing by the printer; and
execute transmission of the generated image data for transmission via the communication interface, in accordance with a transmission instruction by the user.
2. The image processing apparatus according to claim 1, wherein the one or more processors further execute a set of instructions so as to:
obtain a print capability of a transmission destination apparatus, and
determine, based on the print capability, whether the transmission destination apparatus can execute printing based on the generated image data for transmission, wherein, in a case where it is determined that the transmission destination apparatus can execute printing based on the generated image data for transmission, the generated image data for transmission is transmitted via the communication interface.

3. The image processing apparatus according to claim 2, wherein
a resolution for printing is obtained as the print capability of the transmission destination apparatus, and
in a case where the resolution for printing of the transmission destination apparatus is greater than or equal to the transmission resolution, it is determined that the transmission destination apparatus can execute printing based on the generated image data for transmission.

4. The image processing apparatus according to claim 2, wherein, in a case where it is determined that the transmission destination apparatus cannot execute printing based on the generated image data for transmission, the one or more processors further execute a set of instructions so as to generate from the generated image data for transmission low-resolution image data of a resolution lower than that of the generated image data for transmission, and transmit the generated low-resolution image data.

5. The image processing apparatus according to claim 4, wherein the one or more processors further execute a set of instructions so as to, in a case where the generated low-resolution image data is transmitted, cause the display to display that the generated low-resolution image data is transmitted.

6. The image processing apparatus according to claim 1, wherein the generated image data for transmission corresponding to the set transmission resolution is transmitted by fax in accordance with the transmission instruction by the user.

7. The image processing apparatus according to claim 1, wherein the one or more processors further execute a set of instructions so as to:
store in the memory the image data generated by causing the scanner to read the original, which has a resolution greater than or equal to a maximum transmission resolution transmittable via the communication interface;
cause the display to further display an instruction screen for accepting an instruction of changing the transmission resolution in the confirmation screen;
generate, in a case where the instruction of changing the transmission resolution is accepted via the instruction screen, the image data for transmission corresponding to the changed transmission resolution; and
execute printing based on the generated image data for transmission and cause the display to display a confirmation screen for allowing a user to confirm whether to execute transmission.

8. The image processing apparatus according to claim 1, wherein the confirmation screen is a screen which is configured to accept a transmission instruction by a user.

9. A control method for controlling an image processing apparatus that has a scanner configured to read an original and to generate image data, the method comprising:
storing image data generated by the scanner in a memory;
setting a transmission resolution;
generating image data for transmission corresponding to the set transmission resolution based on the image data stored in the memory;
printing the generated image data for transmission;
displaying a confirmation screen for allowing a user to confirm whether to execute transmission, in accordance with a completion of the printing step; and
transmitting the generated image data for transmission via a communication interface to an outside, in accordance with a transmission instruction by the user.

10. The method according to claim 9, further comprising:
obtaining a print capability of a transmission destination apparatus, and
determining, based on the print capability, whether the transmission destination apparatus can execute printing based on the generated image data for transmission,
wherein, in a case where it is determined that the transmission destination apparatus can execute printing based on the generated image data for transmission, the generated image data for transmission is transmitted via the communication interface.

11. The method according to claim 10, wherein
a resolution for printing is obtained as the print capability of the transmission destination apparatus, and
in a case where the resolution for printing of the transmission destination apparatus is greater than or equal to the transmission resolution, it is determined that the transmission destination apparatus can execute printing based on the generated image data for transmission.

12. The method according to claim 10,
wherein, in a case where it is determined that the transmission destination apparatus cannot execute printing based on the generated image data for transmission, further comprising generating from the generated image data for transmission low-resolution image data of a resolution lower than that of the generated image data for transmission, and transmitting the generated low-resolution image data.

13. The method according to claim 12, wherein in a case where the generated low-resolution image data is transmitted, further comprising displaying that the generated low-resolution image data is transmitted.

14. The method according to claim 9, wherein the generated image data for transmission corresponding to the set transmission resolution is transmitted by fax in accordance with the transmission instruction by the user.

15. The method according to claim 9, further comprising
storing in the memory the image data generated by the scanner, which has a resolution greater than or equal to a maximum transmission resolution transmittable via the communication interface;
displaying an instruction screen for accepting an instruction of changing the transmission resolution in the confirmation screen;
generating, in a case where the instruction of changing the transmission resolution is accepted via the instruction screen, the image data for transmission corresponding to the changed transmission resolution; and
printing based on the generated image data for transmission and displaying a confirmation screen for allowing a user to confirm whether to execute transmission.

16. The method according to claim 9, wherein the confirmation screen is a screen which is configured to accept a transmission instruction by a user.

17. A non-transitory computer-readable storage medium for storing a computer program for controlling an image processing apparatus that has a scanner configured to read an original and to generate image data, the computer program comprising:
storing image data generated by the scanner in a memory;
setting a transmission resolution;

generating image data for transmission corresponding to the set transmission resolution based on the image data stored in the memory;

printing the generated image data for transmission;

displaying a confirmation screen for allowing a user to confirm whether to execute transmission, in accordance with a completion of the printing step; and transmitting the generated image data for transmission via a communication interface to an outside, in accordance with a transmission instruction by the user.

* * * * *